April 17, 1928.

J. W. SHANNON ET AL

ROTARY VALVE MECHANISM

Filed June 15, 1925  4 Sheets-Sheet 2

INVENTOR.
John W. Shannon &
John F. Pagendarm.
BY
Denny, Strong, Townsend & Loftus
ATTORNEYS.

April 17, 1928. 1,666,513
J. W. SHANNON ET AL
ROTARY VALVE MECHANISM
Filed June 15, 1925 4 Sheets-Sheet 3

INVENTOR.
John W. Shannon &
John F. Pagendarm
BY
Davy, Strong, Townsend & Loftus
ATTORNEYS.

April 17, 1928.  J. W. SHANNON ET AL  1,666,513
ROTARY VALVE MECHANISM
Filed June 15, 1925   4 Sheets-Sheet 4

INVENTOR.
John W. Shannon &
BY  John F. Pagendarm.

Davey, Strong, Townsend & Loftus
ATTORNEYS

Patented Apr. 17, 1928.

1,666,513

UNITED STATES PATENT OFFICE.

JOHN W. SHANNON, OF SAN RAFAEL, AND JOHN F. PAGENDARM, OF OAKLAND, CALIFORNIA, ASSIGNORS TO SHANNON ROTARY VALVE MOTOR COMPANY, OF SAN FRANCISCO, CALIFORNIA, A CORPORATION OF CALIFORNIA.

ROTARY VALVE MECHANISM.

Application filed June 15, 1925. Serial No. 37,148.

This invention relates to a rotary valve mechanism such as may be employed in internal combustion engines, steam engines, air compressors, and the like, and particularly to improvements on the valve structure shown in Patent No. 1,308,722 entitled Rotary valve gas engine, issued to John F. Pagendarm, July 1, 1919.

The valve mechanism disclosed in the patent referred to employs a rotary sleeve valve which surrounds a cylinder, said cylinder and valve having inlet and discharge ports formed therein which are alternately opened and closed during rotation of the sleeve valve, and it also embodies a pair of sealing plugs to prevent leakage of fluid from the cylinder through the ports during compression, firing, or otherwise. The sealing plugs employed were cylindrical shaped in cross section, necessitating the use of means for securing the same against rotation about their longitudinal axis, and a large diameter was required to ensure the proper port areas. The sleeve valve was also large in diameter due to its position exterior of the cylinder. This necessarily increased the spacing between the cylinders where two or more were employed, and it increased the peripheral speed of the valves, etc.

The valve mechanism forming the subject matter of the present application also embodies a rotary sleeve valve together with sealing plugs to prevent leakage through the ports, but the objection to using sleeves and plugs of large diameter together with means for securing the plugs against rotation has been overcome, first, by placing the sleeve valves in the heads of the cylinders, which permits a material reduction in diameter, reduced peripheral speed, and which also permits close spacing of the cylinders; and, secondly, by employing sealing plugs which are oval or elliptical shaped in cross section so that the port areas may be readily increased and means for securing the plugs against rotation may be entirely eliminated. The present application also embodies a cylinder head structure for the reception of the sleeve valves and plugs, means for preventing leakage around the plugs, a novel driving mechanism for the sleeve valves, and other features which will be more fully described in the accompanying specification, claims, and drawings, in which—

Figure 1:
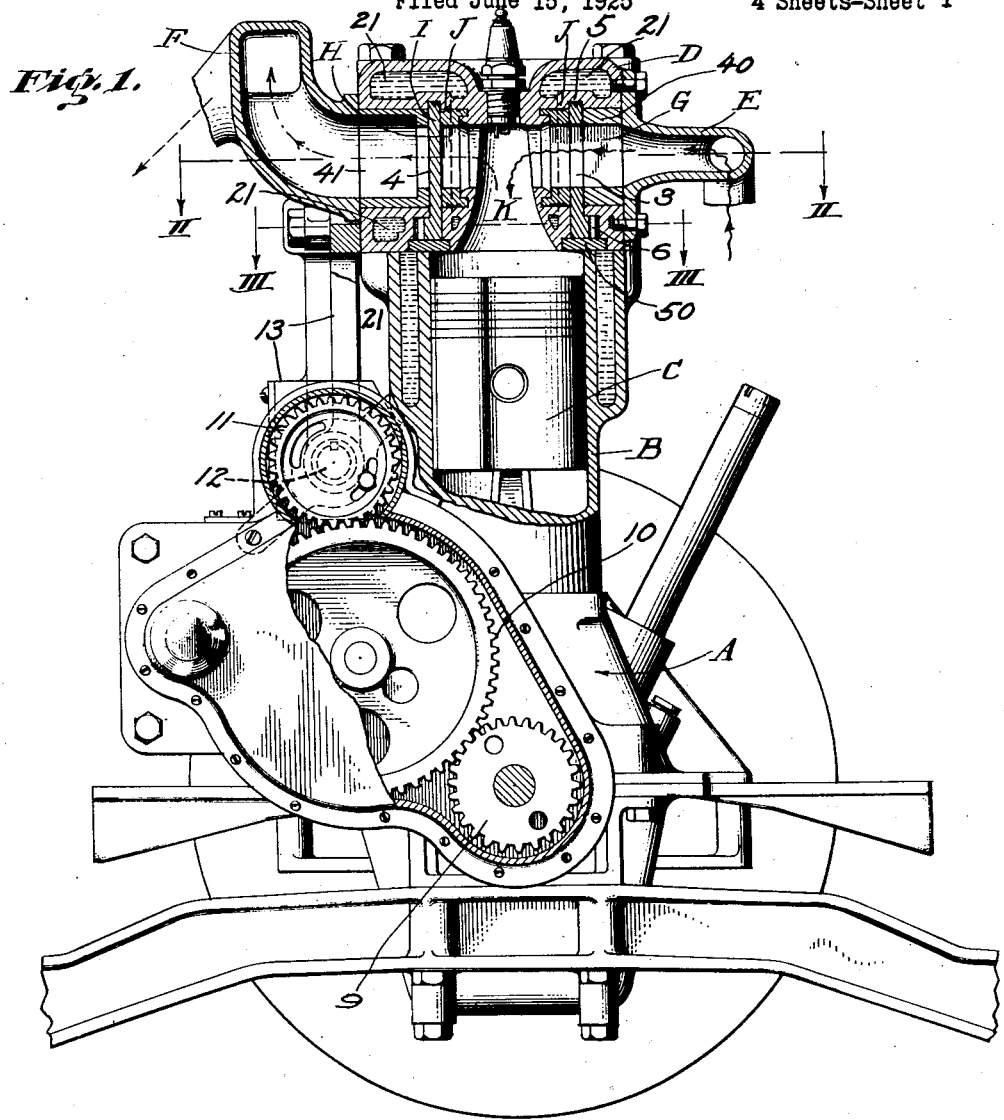
Fig. 1 is an end view partially in section of a standard form of internal combustion engine showing the application of the valve mechanism which forms the subject matter of this application.
Figure 10:
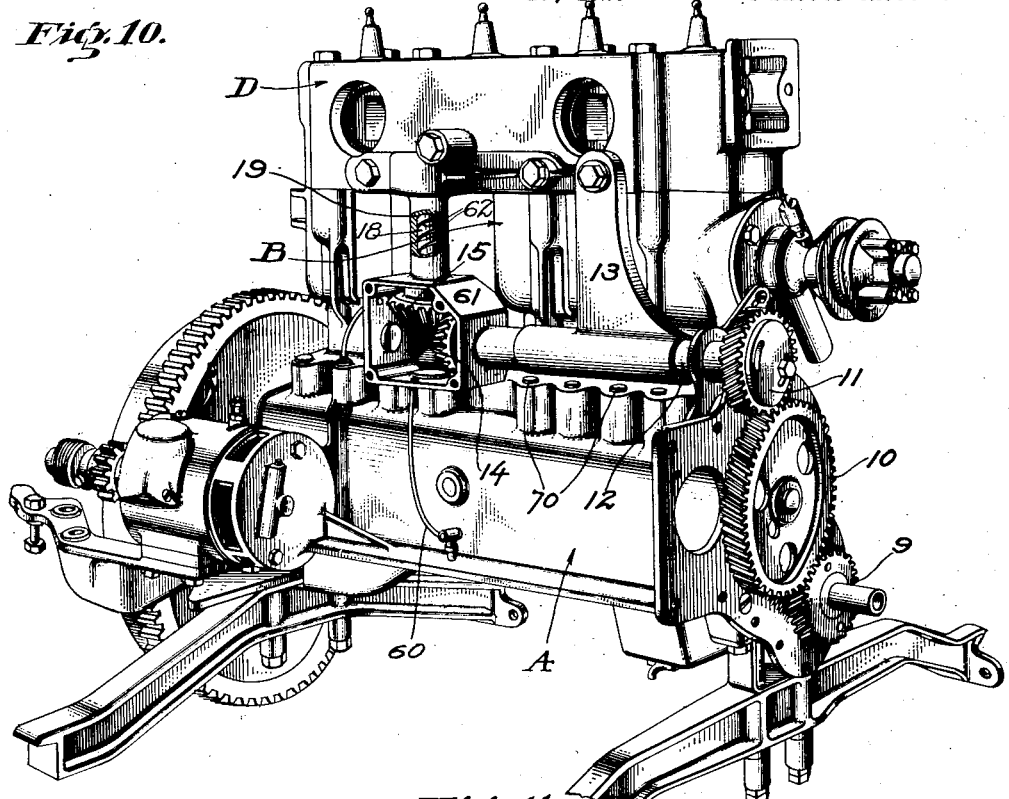
Fig. 10 is a perspective view of an internal combustion engine showing the application of the invention and particularly illustrating the gear drive employed.

Referring to the drawings in detail and particularly to Figs. 1 and 10, A indicates the crank case of a standard form of internal combustion engine, B the cylinders supported thereby, C the pistons mounted therein, and D the cylinder head. The head is provided with an inlet manifold E connected with a suitable form of carburetor not here illustrated, and it is also provided with an exhaust manifold F. The head proper is provided with inlet ports generally indicated at G through which the explosive mixture is admitted from the cylinders, and it is also provided with exhaust ports generally indicated at H through which the gases are expelled during the exhaust stroke. A novel form of sleeve valve I is provided for the purpose of admitting and releasing the gases. Sealing plugs generally indicated at J are employed for the purpose of preventing leakage of the gases during compression, firing, and otherwise, and as the sleeve valve together with the sealing plugs forms the main subject matter of the present application, a detailed description thereof will be submitted.

Referring to Figs. 1, 2, 3, and 11, it will be noted that four sleeve valves are employed, one for each cylinder. These sleeve valves are perhaps best illustrated in Fig. 11. They are nothing more or less than cylindrical shaped, elongated sleeves such as indicated at 2. They have two ports formed therein as shown at 3 and 4. These ports are rectangular in shape and are spaced apart approximately 180°. The upper ends of the sleeves are provided with V-shaped grooves as indicated at 5 for the purposes of lubrication as will hereinafter be described, and the lower ends are provided with spur gears 6 by which they are rotated. The sleeve valves are vertically disposed in the cylinder head D as shown in Fig. 1, and pockets are formed in the cylinder head for their reception. The inlet ports G are formed in one side of the head while the exhaust ports are formed in the opposite side. The ports are arranged in pairs and so are the sleeve valves. The gears 6 of each pair of valves intermesh but two separate driving gears are employed to rotate the same, these gears being illustrated at 7 and 8. Gear 7 is the driving gear and gear 8 serves the function of an intermediate. Gear 7 drives the pair of gears and valves located on the right hand end of the engine and gear 8 the gears and valves on the left hand end. Any suitable driving means may be employed for transmitting rotary movement to the gears 7 and 8, but the type of drive illustrated in Fig. 10 may be employed; that is, the crank shaft of the engine is provided with a driving pinion 9. This intermeshes with an intermediate gear 10 which in turn drives a gear 11. This gear is secured on one end of a shaft 12 which is journaled in a bearing bracket 13. The opposite end of shaft 12 carries a bevel gear 14. This meshes with a second bevel gear 15 secured on a vertically disposed shaft 18 journaled in a bearing bracket 19. This shaft has a second gear secured on its upper end as indicated at 20, and this gear intermeshes with the gear 7 and accordingly drives the whole valve gear train shown in Fig. 8, the gear ratio being such that the sleeve valve will rotate one revolution to four of the crank shaft.

Figure 8:
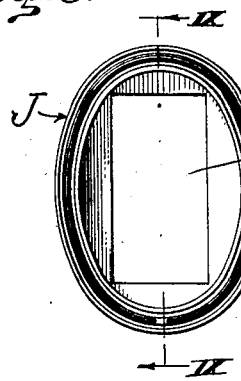
Fig. 8 is an end view of the type of sealing plug shown in Fig. 7.
Figure 12:
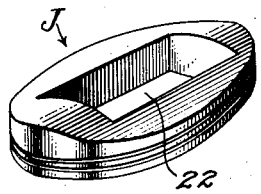
Fig. 12 is a perspective view of one of the sealing plugs.

The cylinder head is provided with cone shaped central chambers K which are in communication with the respective cylinders and the exhaust and inlet ports. The cylinder head is water-jacketed as indicated at 21 and this jacket is so arranged that both the interior and exterior walls of the sleeve valves are cool. The sealing plugs J are interposed between the chambers K and the interior surface of the valves, and pockets are formed in the head for the reception of said plugs. The plugs are furthermore oval or elliptical shaped in cross section as shown in Figs. 8 and 12, and so are the pockets which are formed in the cylinder head for their reception. This is an exceedingly important feature as it permits the formation of rectangular shaped ports in the sealing plugs as indicated at 22, or in other words, ports of practically any area desired. An elliptical shape also eliminates the necessity of employing means for securing the plugs against rotation about their longitudinal axis. The oval or elliptical shape is of further importance as an evenly distributed contact area is formed between each plug and sleeve valve, thus producing uniform wear and minimizing lubricating problems. The rectangular shaped ports 22 in one set of plugs register with the inlet ports G and the rectangular shaped ports in the opposite sealing plugs register with the exhaust ports H. The rectangular shaped ports 3 and 4 in the sleeve valves alternately register with the respective plugs and inlet and exhaust passages, and they accordingly serve the alternate function of inlet and exhaust ports. This is also important as the ports in the sleeve valve are heated while they serve the function of exhaust ports and they are cooled while serving the function of inlet ports. Uniform valve temperature and expansion is thereby obtained.

Figure 6:
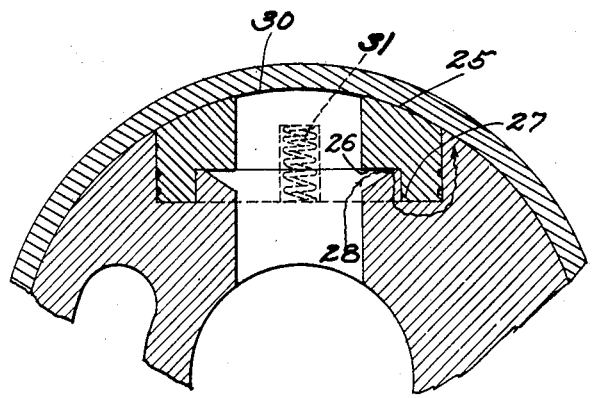
Fig. 6 is an enlarged horizontal cross section of one of the sealing plugs, a portion of the sleeve valve with which it engages, and that part of the cylinder head which supports the sealing plug.
Figure 7:
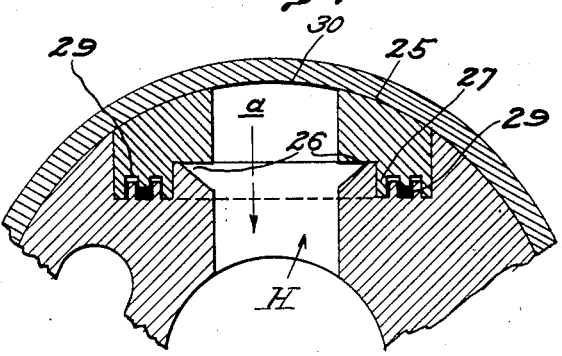
Fig. 7 is a similar view showing a modified form of sealing plug.
Figure 9:
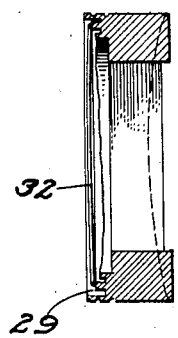
Fig. 9 is a vertical central cross section of the sealing plug taken on line 9—9 of Fig. 8.

Means are also employed for preventing leakage around the exterior periphery of the plugs and means are employed for retaining the plugs in contact with the inner surface of the sleeve valve. This is best illustrated in Figs. 6, 7, 8 and 9. The surface of the plug which contacts with the inner surface of the sleeve valve is indicated at 25. The opposite surface is recessed as indicated at 26, and an annular elliptical shaped projection 27 is thus formed. Hence, if gases tend to escape they will have to follow the path of the arrow indicated at 28 in Fig. 6. This tortuous path resists the movement or escape of gases and comparatively little, if any, leakage is permitted. To further decrease or retard the escape of gases in this direction, a modified structure is shown in Fig. 7. In this instance, a labyrinth packing is formed on the inner end of the plug as indicated by the recesses shown at 29, this type of structure being particularly desirable when used in high compression engines of the Diesel type or in high pressure air compressors. To secure a contact between the outer faces 25 of the plug and the inner faces 30 of the sleeve valves spring tension may be employed. In Fig. 6 a pair of coil springs are interposed between the plug and the cylinder as indicated at 31. In Figs. 7, 8, and 9 elliptical shaped spring is employed, this being perhaps preferable as a more uniform pressure is exerted over the entire surface of the plug, the elliptical spring being indicated at 32. The tension of the springs shown in 31 and 32 is not very great. In fact, it should just be sufficient to maintain the plugs in contact with the valves when the engine is not in operation as the pressure of the gases may be depended upon to maintain the contact when the engine is in operation. By reference to Figs. 6 and 7, it will be noted that the outer ends of the ports H are slightly beveled so as to expose the inner faces 26 of the plugs. The gases under pressure, both during compression and during firing exert their pressure on these faces and this pressure is more than sufficient to maintain proper contact between the plugs and the valves.

In connection with this matter, it might be well to state that the plugs are fairly free in the pockets or recesses formed for their reception; that is, a slight endwise movement is permitted. This is also important as it permits a fluttering action of each plug during operation. During the suction stroke, a pull is exerted on the plugs in the direction of arrow a due to the exposed surfaces 26. This suction action or pull is sufficient to relieve the pressure on the plugs on the inner face of the sleeve valves, and it can therefore be seen that the tension of the springs 31 is fairly small. In fact, it must be less than the pull created during the suction stroke as the fluttering action desired would otherwise be prevented. During compression or firing the pressure on the surfaces 26 is reversed and the plugs are thus forced back into contact with the valves and a sealed and tight connection is formed at the time required. This reciprocal movement of the plugs, which has been referred to as a fluttering action, is very important as it permits lubricant to enter between the plugs and the inner face of the valve. It permits foreign matter to free itself if it should happen to be interposed, and relieves the plugs and the inner faces of the valves of unnecessary pressure and wear at the time when no pressure is required.

Figure 2:
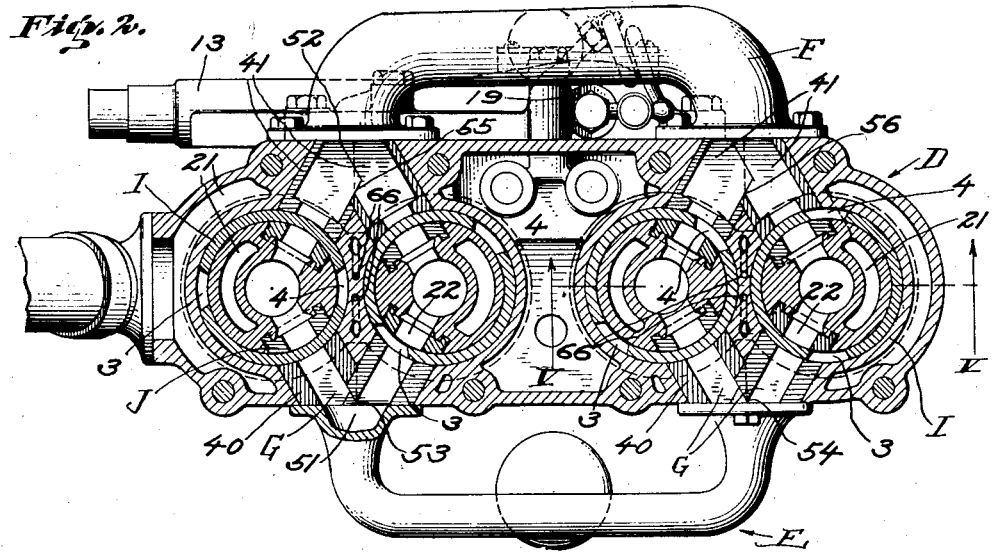
Fig. 2 is a cross section taken on line 2—2 of Fig. 1.
Figure 3:
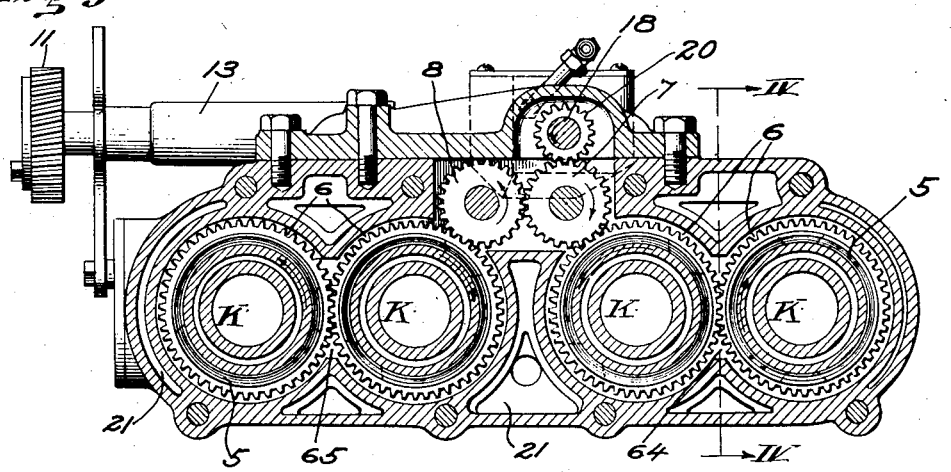
Fig. 3 is a cross section taken on line 3—3 of Fig. 1.
Figure 11:
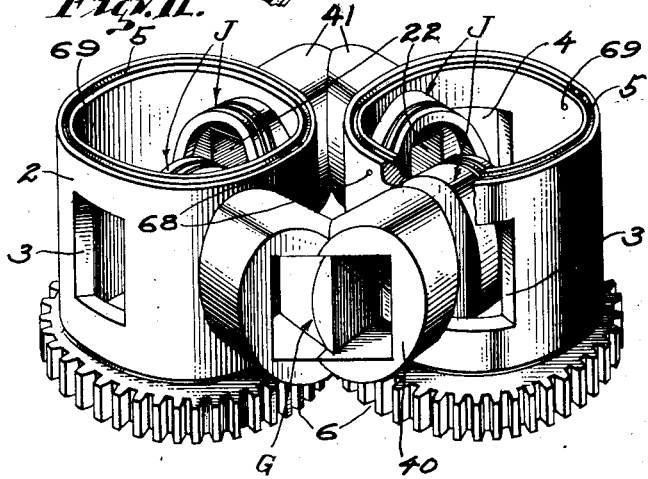
Fig. 11 is a perspective view of two of the sleeve valves removed from the cylinder head, said view showing the position assumed by the same when in the cylinder head, and said view also showing the position of the sealing plugs and the fillers.

By referring to Figs. 1, 2, and 11, it will be noted that the inlet passages G and similarly the exhaust passages H are provided with filler members shown at 40 and 41. These filler members are inserted for the purpose of maintaining a uniform velocity, particularly of the incoming gases. Their function will no doubt be understood when particular reference is made to Fig. 1 as it will there be seen that the cylinder head is formed from a single casting. In view thereof, it is necessary to machine the pockets for the reception of the sealing plugs from an exterior point, and it is accordingly obvious that holes must be bored from the exterior surface of the cylinder head to form the pockets which receive the sealing plugs J. After the pockets have been machined, it is also necessary to refill the holes or passages formed exterior of the sleeve valve during the machining operation, as the velocity of the gases would drop at points intermediate the inlet manifold and the valve proper; and it is for this reason that the filler members 40 have been inserted, as these filler members have passages formed therein which have an area so proportioned as to maintain the proper gas velocities.

The head must also be machined to form the pockets for the reception of the sleeve valves. It is turned from the lower face and means must therefore be employed for supporting the sleeve valves as they are vertically disposed in the head and for sealing the pockets formed for the valves with relation to the cylinders. This is accomplished by machining an additional recess such as shown in Fig. 1 and placing a combination bearing and sealing ring therein as indicated at 50. These rings are interposed between the cylinder head proper and the upper ends of the cylinders, and a perfect seal is thus made between the valve pockets and the cylinders, and the rings at the same time serve the function of bearing members to support the sleeve valve gears. By referring to Fig. 2, it will be noted that the inlet ports are arranged in pairs on one side of the cylinder head and that the exhaust ports are arranged in pairs on the opposite side of the cylinder head. It will further be noted that the exhaust and inlet ports are disposed on angles of substantially 61° with relation to a median or center line drawn through the valves. This is also important as it permits the inlet and exhaust ports to be brought close together where they may be connected with the inlet and exhaust manifolds through single connections as indicated at 51 and 52. The inlet ports in other words intersect each other on angles of approximately 61° at the points indicated at 53 and 54, and so do the exhaust ports at the points indicated at 55 and 56. The spacing between the exhaust and inlet ports with relation to their valves is substantially 123° and the spacing between the ports in the valves is approximately 180°. This is also important as it permits the valve ports to alternately serve the functions of inlet and exhaust ports. The valves are arranged in pairs and they also rotate in opposition to each other due to the fact that they are driven or rotated by means of intermeshing gears. Such an arrangement and drive may be resorted to where two, four, or more cylinders are employed, and while the spacing between the exhaust and inlet ports of 123° has been specified, it is obvious that this is due to the fact that the lead or advance is required with relation to the piston movement and may therefore be increased or decreased in proportion to the speed of the engine. The central chambers formed in the cylinder head as indicated at C are more or less cone shaped as shown in Fig. 1. Their lower ends have a diameter less than the diameter of the respective cylinders, and annular shoulders are thus formed which materially promote turbulence of the incoming gases. Such turbulence is further promoted due to the fact that the inlet ports are horizontally arranged with relation to the vertically disposed chambers K. The advantage of promoting turbulence in the gases need hardly be entered into as it is very well known at this date that turbulence is important to maintain the atomized fuel in an atomized condition and also to promote flame propagation.

Figure 4:
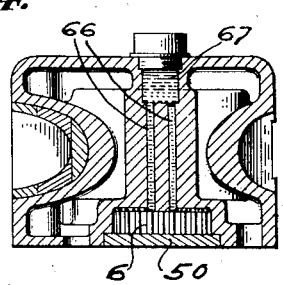
Fig. 4 is a vertical cross section taken on line 4—4 of Fig. 3.
Figure 5:
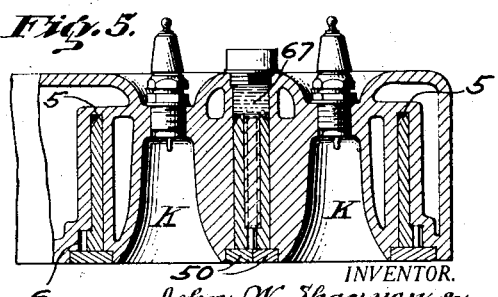
Fig. 5 is another vertical cross section taken on line 5—5 of Fig. 3.

The valves may be lubricated in any suitable manner, but as the valves are driven or rotated by means of intermeshing gears advantage has been taken of this fact so that the gears may be utilized as pumps to circulate the lubricating oil. The oil is driven from the crank case through means of a pipe 60 (see Fig. 10) to a housing generally indicated at 61 which encloses the bevel gears 14 and 15. The shaft 18 carrying the gear 15 has a worm cut in its exterior surface as indicated at 61 and this worm carries the oil up to the gears 20, 7 and 8. This oil is here distributed to the gears which rotate the valves (see Fig. 3) and it is carried around with these gears. The oil is trapped between intermeshing points of the gears as indicated at 64 and 65, and sufficient pressure is thus created to force the oil vertically upwardly through tubes 66 such as shown in Figs. 4 and 5. The oil is thus elevated to pockets or chambers 67 formed above the valves and it is here deposited in the V-shaped grooves formed at their upper ends. The oil is then delivered to the exterior and the exterior surfaces of the valve by means of drilled holes as indicated at 68 and 69, and both surfaces are thus thoroughly lubricated. The oil is of course maintained in constant circulation when the engine is in operation and lubrication is thus automatically taken care of.

By referring to Fig. 10 it will be noted that a standard late model of Chevrolet motor is illustrated. The cam shaft which carries the gear 10 remains in the motor but the valve tappets, rods, springs, etc., have all been removed as this mechanism is completely replaced by the gear drive illustrated and the rotary valve mechanism which is enclosed with the head.

A motor especially designed to receive the valve mechanism here illustrated would very likely appear quite different from the motor illustrated in Fig. 10. For instance, the pusher rod guides illustrated at 70 might be eliminated and so would the cam shaft and bearings therefor. We therefore wish it understood that the invention is by no means limited to a motor such as here illustrated, nor is it limited to internal combustion motors, as it might be applied with equal success to air compressors, steam engines, and the like.

Having thus described our invention, what we claim and desire to secure by Letters Patent is—

1. In an engine of the character described, a cylinder, a piston, and a cylinder head, a sleeve valve journalled in the head, said sleeve valve and head having ports formed therein in communication with the cylinder, and a pair of sealing plugs mounted in the head and engaging the inner faces of the sleeve valve.

2. In an engine of the character described, a cylinder, a piston, and a cylinder head, said head having an annular vertically disposed pocket formed therein open at the bottom, and a pair of exhaust and inlet ports, a rotary valve adapted to be received by said pocket and having ports formed therein adapted to alternately register with the exhaust and inlet ports, and a combination bearing and sealing ring interposed between the valve and the cylinder and forming a closure for the lower open end of the annular pocket.

3. In an engine of the character described, a cylinder, a piston, and a cylinder head, said head having an annular vertically disposed pocket formed therein, and a pair of exhaust and inlet ports, a rotary valve adapted to be received by said pocket and having ports formed therein adapted to alternately register with the exhaust and inlet ports, a combination bearing and sealing ring interposed between the valve and the cylinder, and a pair of sealing plugs disposed in the head, one in the exhaust and one in the inlet port, and engaging the inner surface of the valve.

4. In an engine of the character described, a cylinder, a piston, and a cylinder head, said head having an annular vertically disposed pocket formed therein and a pair of exhaust and inlet ports, said pocket being closed at its upper end, a rotary sleeve valve adapted to be received by said pocket and having ports formed therein adapted to alternately register with the exhaust and inlet ports, means forming a closure for the lower end of the pocket and a support for the valve, a pair of sealing plugs disposed in the head, one in the inlet port and one in the exhaust port, engaging the inner surface of the valve.

5. In an engine of the character described, a cylinder, a piston, and a cylinder head, said head having an annular vertically disposed pocket formed therein and a pair of exhaust and inlet ports, a rotary sleeve valve adapted to be received by said pocket, a pair of sealing plugs disposed in the head, one in the exhaust and one in the inlet port, and engaging the inner surface of the valve, and means whereby a reciprocal movement is imparted to the plugs during pressure changes within the cylinder.

6. In an engine of the character described, a cylinder, a piston, and a cylinder head, said head having an annular vertically disposed pocket formed therein and a pair of exhaust and inlet ports, a rotary sleeve valve adapted to be received by said pocket, a pair of sealing plugs disposed in the head, one in the exhaust and one in the inlet port, and engaging the inner surface of the valve, and a surface on each plug adapted to be exposed to the fluid under pressure within the cylinder and adapted to impart a reciprocal movement to each plug during pressure changes of the fluid.

7. In an engine of the character described, a head having inlet and exhaust ports formed therein, a rotary sleeve valve adapted to open and close said ports, a pair of sealing plugs, one in the inlet and one in the exhaust passage and engaging the sleeve valve, said plugs being elliptical shaped in cross section and each plug having a port formed therein.

8. In an engine of the character described, a cylinder, a piston, and a cylinder head, said head having inlet and exhaust passages formed therein in communication with the cylinder, a rotary sleeve valve in the head adapted to open and close said ports, a pair of sealing plugs, one in the inlet and one in the exhaust passage, a spring interposed between each plug and the head to maintain the plugs in engagement with the sleeve valve, and a surface on each plug exposed to fluid within the cylinder during suction and compression which is caused by the piston, said fluid acting on the surface of the plugs to increase contact pressure during compression, and to completely counteract the spring tension and thereby break contact during suction.

9. In an engine of the character described, a head having inlet and exhaust ports formed therein, a rotary sleeve valve adapted to open and close said ports, a pair of sealing plugs, one in the inlet and one in the exhaust passage, and engaging the sleeve valve, said plugs being elliptical shaped in cross section.

10. In an engine of the character described, a head having inlet and exhaust ports formed therein, a rotary sleeve valve adapted to open and close said ports, a pair of sealing plugs, one in the inlet and one in the exhaust passage, said plugs engaging the inner surfaces of the valve and presenting elliptical surfaces against the valves.

11. In an engine of the character described, a head having inlet and exhaust ports formed therein, a rotary sleeve valve adapted to open and close said ports, a pair of sealing plugs, one in the inlet and one in the exhaust passage, one end of each plug engaging the valve, said plugs being elliptically shaped in cross section and the surfaces engaging the valve being rounded to fit the surface of the valve.

12. In an engine of the character described, a head having inlet and exhaust ports formed therein, a rotary sleeve valve adapted to open and close said ports, a pair of sealing plugs, one in the inlet and one in the exhaust passage, one end of each plug engaging the valve, and a labyrinth packing member on the opposite end of each plug to prevent leakage around the plugs.

13. In an engine of the character described, a cylinder, a piston, and a cylinder head, said head having inlet and exhaust passages formed therein in communication with the cylinder, a rotary sleeve valve in the head adapted to open and close said ports, a pair of sealing plugs, one in the inlet and one in the exhaust passage, said plugs presenting elliptical shaped surfaces to the sleeve valve, and means whereby fluid under pressure in the cylinder will maintain the plugs in contact with the valve.

14. In an engine of the character described, a cylinder, a piston, and a cylinder head, said head having inlet and exhaust passages formed therein in communication with the cylinder, a rotary sleeve valve in the head adapted to open and close said ports, a pair of sealing plugs, one in the inlet and one in the exhaust passage, said plugs presenting elliptical shaped surfaces to the sleeve valve, and springs interposed between the head and the plugs to maintain the same in contact with the sleeve valve.

JOHN W. SHANNON.
JOHN F. PAGENDARM.